(12) United States Patent
Liu et al.

(10) Patent No.: US 10,270,729 B2
(45) Date of Patent: Apr. 23, 2019

(54) METHOD AND SYSTEM FOR MESSAGING (71) Applicant: International Business Machines Corporation, Armonk, NY (US)

(72) Inventors: Yi X. Liu, Beijing (CN); Dale M. Schultz, Limerick, ME (US); Jing Xing, Beijing (CN); Zuo Peng Zhang, Tianjin (CN)

(73) Assignee: International Business Machines Corporation, Armonk, NY (US)

( * ) Notice: Subject to any disclaimer, the term of this patent is extended or adjusted under 35 U.S.C. 154(b) by 357 days.

(21) Appl. No.: 14/625,050

(22) Filed: Feb. 18, 2015

(65) Prior Publication Data
US 2015/0312196 A1 Oct. 29, 2015

(30) Foreign Application Priority Data

Apr. 29, 2014 (CN) .......................... 2014 1 0178149

(51) Int. Cl.
*H04L 12/58* (2006.01)
(52) U.S. Cl.
CPC .............. *H04L 51/28* (2013.01); *H04L 51/22* (2013.01)
(58) Field of Classification Search
CPC ................................ H04L 51/28; H04L 51/22
See application file for complete search history.

(56) References Cited

U.S. PATENT DOCUMENTS

| 7,430,580 | B2 | 9/2008 | Baratakke et al. | |
| 7,818,385 | B2 * | 10/2010 | Naick | G06Q 10/107 709/206 |
| 7,882,183 | B2 * | 2/2011 | Craft | G06Q 10/107 709/204 |

(Continued)

FOREIGN PATENT DOCUMENTS

WO 2011144384 A1 11/2011

OTHER PUBLICATIONS

Chang et al., "Adding Additional Recipients to Existing Emails", IPCOM000217058D, Publication Date: Apr. 30, 2012, <http://ip.com/IPCOM/000217058>.

(Continued)

*Primary Examiner* — Philip J Chea
*Assistant Examiner* — Robert B McAdams
(74) *Attorney, Agent, or Firm* — Gilbert Harmon, Jr.

(57) ABSTRACT

The present invention relates to a messaging technique, and more specifically, relates to a method and system for messaging using information of predetermined message recipients. According to one aspect of the present invention, there is provided a method for messaging, comprising: obtaining message recipients designated by a to-be-sent message; obtaining predetermined message recipients corresponding to the to-be-sent message; and in response to inconsistency between the designated message recipients and the predetermined message recipients, unifying the designated message recipients and the predetermined message recipients. According to the method and system for messaging provided (Continued)

by the present invention, message recipients may be efficiently controlled and uniformed so as to avoid missing of recipients or to promptly update message recipient information. Further, the messaged content can be efficiently controlled and unified.

12 Claims, 4 Drawing Sheets

(56) References Cited

U.S. PATENT DOCUMENTS

| | | | | |
|---|---|---|---|---|
| 7,979,495 | B2* | 7/2011 | Radenkovic | G06Q 10/107 |
| | | | | 709/202 |
| 8,392,519 | B2* | 3/2013 | Madnani | G06Q 10/107 |
| | | | | 709/206 |
| 8,521,822 | B2* | 8/2013 | Tu | H04L 51/24 |
| | | | | 709/206 |
| 9,171,291 | B2* | 10/2015 | Martin | H04L 51/28 |
| 2007/0073871 | A1* | 3/2007 | Adams | G06Q 10/107 |
| | | | | 709/224 |
| 2008/0098070 | A1 | 4/2008 | Heidloff et al. | |
| 2009/0313342 | A1* | 12/2009 | Thie | G06Q 10/00 |
| | | | | 709/206 |
| 2010/0293475 | A1 | 11/2010 | Nottingham et al. | |
| 2013/0262590 | A1 | 10/2013 | Patil et al. | |

OTHER PUBLICATIONS

Chinese Patent Application No. CN201410178149.9 filed Apr. 29, 2014.

* cited by examiner

METHOD AND SYSTEM FOR MESSAGING

BACKGROUND OF THE INVENTION

The present invention relates to a technique of messaging, and more specifically, to a method and system for messaging using information of a predetermined message recipient.

Currently, in the field of widely applied message delivery (e.g., email, mobile phone short message SMS, instant message, etc.), it always occurs that the same message content might be replied or forwarded by multiple persons for multiple times, and a new recipient might be introduced in the reply and forwarding procedures such that the recipient information is inconsistent. Further, some recipient might miss relevant message content. For example, A sends an email to B and C, B replies A's email and adds D as a new recipient, while C also replies A's email and adds E as a new recipient. In this way, D is not listed in the recipients of the email as replied by C, while E is not listed in the recipients of the email as replied by B. Therefore, if D continues replying to B's email, he/she will not list E as a recipient; likewise, E will not list D as a recipient when he/she continues replying to C's email. If E needs to know what new message content is added when D replies to B's email, it requires that B or other recipients in the list of the recipients of the email to which D replies manually forward the email to E, which causes confusion and inconsistency during the messaging procedure and further significantly dampens the accuracy and efficiency of messaging. Besides, if B subsequently forwards the email not based on the latest email content formed after D replies to it, but based on the original email content sent by A, the email received by a recipient will miss the latest email content about the same email subject.

At present, the solution for this problem in the prior art is that the message sender needs to send the complete message content separately later to the missing recipient. However, this can only solve one time missing issue. If a newly added recipient occurs afterwards, messaging confusion and inconsistency will still arise. Such ex post remediation and manual control is inefficient and error-prone. Meanwhile, the prior art has no mechanism to avoid missing of message content (i.e., the conditions in which the sender sends out of negligence, not based on the latest email content).

SUMMARY

In view of the above problem existing in the prior art, one of the objectives of the present invention is to provide a method and system for controlling and unifying message recipients for messages of the same subject during a messaging procedure. Further, one of the objectives of the present invention is to provide a method and system capable of controlling and unifying the sent message content for messages of the same subject during the messaging procedure. The above objectives are not invention objects that must be simultaneously implemented by the present invention; instead, based on different embodiments of the present invention, the above invention objectives may be implemented alternatively or simultaneously.

According to one aspect of the present invention, there is provided a method for messaging, comprising: obtaining message recipients designated by a to-be-sent message; obtaining predetermined message recipients corresponding to the to-be-sent message; and in response to inconsistency between the designated message recipients and the predetermined message recipients, unifying the designated message recipients and the predetermined message recipients.

According to another aspect of the present invention, there is provided a system for messaging, comprising: a first obtaining module configured to obtain message recipients designated by a to-be-sent message; a second obtaining module configured to obtain predetermined message recipients corresponding to the to-be-sent message; and a unifying module configured to, in response to inconsistency between the designated message recipients and the predetermined message recipients, unify the designated message recipients and the predetermined message recipients.

According to the method and system for messaging provided by the present invention, message recipients may be efficiently controlled and uniformed so as to avoid missing of recipients or to promptly update message recipient information. Further, the messaged content can be efficiently controlled and unified.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
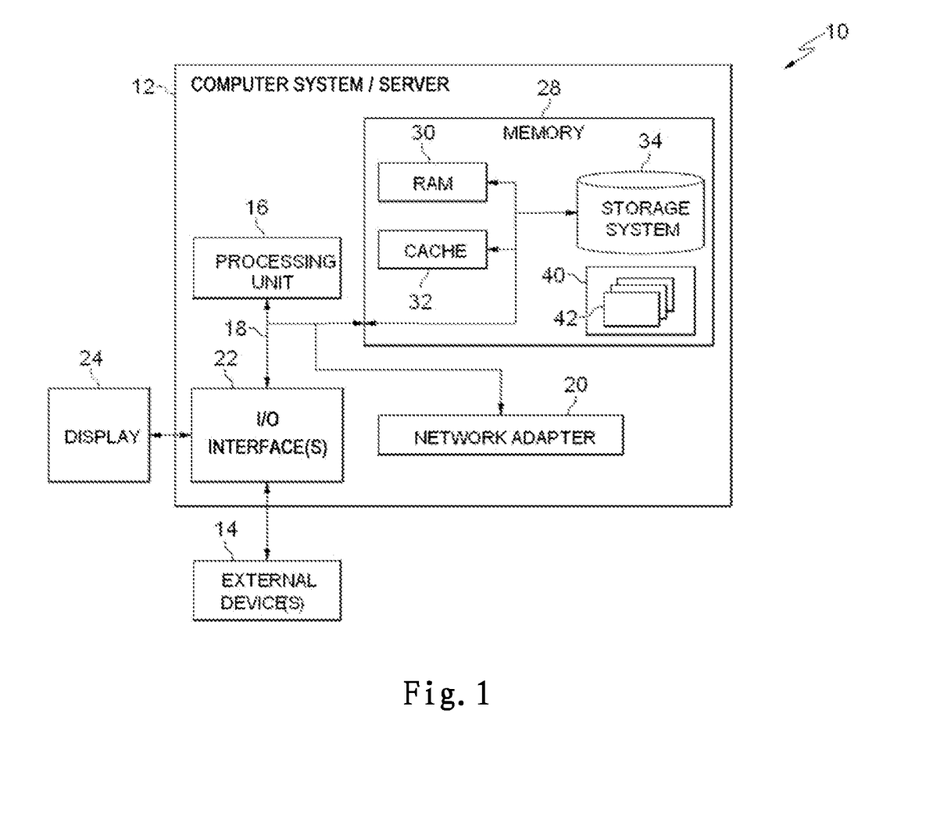
FIG. 1 shows a block diagram of an exemplary computer system/server which is applicable to implement the embodiments of the present invention.

Referring now to FIG. 1, in which an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processor(s) or processing unit(s) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external device(s) 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interface(s) 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
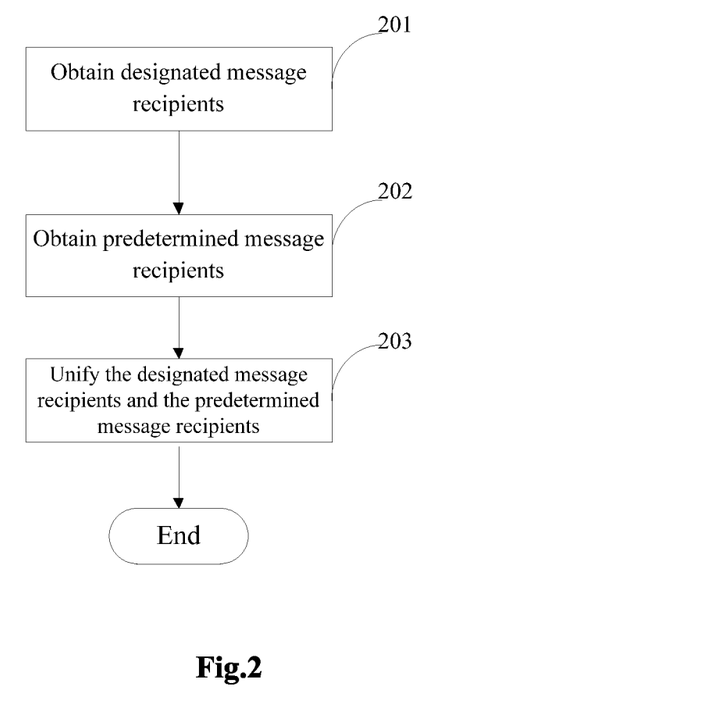
FIG. 2 shows a schematic diagram of a method for messaging according to one embodiment of the present invention.

Before introducing FIG. 2, the meanings of several technical terms in the present invention are firstly defined. In the present invention, unless indicated otherwise, the meanings of the following technical terms are defined as follows:

"Message" refers to any data information transmitted by electrical signal or optical signal, including, but not limited to, an email message, a mobile phone short message SMS, and any information delivered through an instant message application.

"Message recipient" refers to any messaging destination indicated by a specific identifier. In different application scenarios, the "message recipient" may be embodied in different manners. For example, in an email scenario, the "message recipient" may be an email address or group identification of a recipient or a cc. In an instant messaging application scenario, the "message recipient" may be a username of a contact. In a mobile phone short messaging service SMS scenario, the "message recipient" may be a mobile phone number of the recipient.

Now, referring to FIG. 2, FIG. 2 shows a flow chart of a method for messaging according to one embodiment of the present invention.

The method of FIG. 2 starts from step 201. In step 201, a message recipient designated for a to-be-sent message is obtained. The message recipient may be designated through input by a user attempting to transmit a message and obtained when the user triggers a "send" or a similar function. From the above definitions of "message" and "message recipient," it is seen that based on different messaging applications, the message recipient may be embodied into different forms. Those skilled in the art should understand that how to obtain message recipient information based on different messaging applications can be implemented using the prior art, which will not be detailed here.

Next, the method of FIG. 2 proceeds to step 202. In step 202, a predetermined message recipient corresponding to the to-be-sent message is obtained. The "predetermined message recipient" differs from the "designated message recipient" in step 201 in that the "predetermined message recipient" is information about the recipient, who has been determined in advance, of the message, while the "designated message recipient" is information of current recipient designated for the message. Therefore, they might be identical or different. It should be emphasized that the predetermined message recipient corresponds to the to-be-sent message. For different to-be-sent messages, there might be different predetermined message recipients. Hereinafter, it would be described in detail how the predetermined message recipient corresponds to the to-be-sent message.

According to one embodiment of the present invention, a correspondence relationship between a predetermined message recipient and the to-be-sent message is established through a unique message identifier. For example, A drafts an email and sends it to B and C, thus when A sends the email, the system will add a unique message identifier to the email. Afterwards, regardless of whether the email received from A is replied or forwarded by B or C, even if the subject of the email is modified, it would automatically carry the same unique message identifier. Therefore, the unique message identifier may be used to uniquely identify a "co-source" email. Those skilled in the art should understand that the specific formats of the unique message identifier added to the message may be various, e.g., number, letter, color, icon, voice, etc. Besides, the unique message identifier may be visible or invisible to a user, and the present invention has no special limitation thereto.

According to another embodiment of the present invention, a correspondence relationship between predetermined message recipients and a to-be-sent message may be established without adding any additional identifier. For example, the correspondence relationship may be established using the content of the message itself. Specifically, according to one embodiment of the present invention, the title of a subject matter of the message may be used to establish a correspondence relationship. It should be noted that, in the field of emails, since identifiers such as "Re:" or "Fw:" may be automatically added in a subject of an email in a forwarding or cc operations, the system may be configured to filter such automatically added symbols for identifying specific operations, so as to establish a correspondence relationship between a predetermined message recipient and a to-be-sent message through actual information of the email subject. Suppose A sends an email titled "aa" to B and C; then, the predetermined message recipient may be corresponded to the to-be-sent message through "aa."

There are a plurality of embodiments on how to predetermine a predetermined message recipient in step 202. According to one embodiment of the present invention, suppose A sends an email titled "aa" to B and C, then A, B and C are predetermined message recipients. When B attempts to reply to the email received from A, he/she may obtain predetermined message recipients A, B and C corresponding to the to-be-sent message (i.e., the email which B attempts to send) according to step 202. Of course, alternatively, the message sender B may be filtered automatically.

According to one embodiment of the present invention, the predetermined message recipient may be updated at any time. For example, when B replies to A, he/she wishes to add D to the recipient or cc, then B may update the predetermined message recipients. According to another embodiment of the present invention, the predetermined message recipients are limited by the originator of the initial message and cannot be updated thereafter. For example, A restricts that the email content can only be sent to B and C, then B cannot update the predetermined message recipient.

Next, in step 203, in response to the designated message recipient being inconsistent with the predetermined message recipient, the designated message recipients and the predetermined message recipients are unified. According to one embodiment of the present invention, unifying the designated message recipients and the predetermined message recipients includes: updating the designated message recipient based on the predetermined message recipient. According to another embodiment of the present invention, unifying the designated message recipients and the predetermined message recipients includes: updating the predetermined message recipient based on the designated message recipient, wherein the updated predetermined message recipient is for providing information of predetermined message recipients for subsequent messaging.

As pointed out in the above example, A sends an email to B and C, then A, B and C become predetermined message recipients. When B attempts to forward the email to D, D becomes the "designated message recipient." At this point, the designated message recipients are inconsistent with the predetermined message recipients, and it is needed to unify them. According to the above two embodiments, the predetermined message recipients may be updated so as to join D in the predetermined message recipients, or the designated message recipients may be updated to as to delete D from the designated message recipients, thereby unifying the designated message recipients and the predetermined message recipients. As to which embodiment is adopted, it depends on selection by the user sending the message or depends on the function of a specific messaging application. No matter which embodiment is adopted, as long as the designated message recipients are unified with the predetermined message recipients, it may guarantee the consistency between the recipients during the messaging process by multi-senders for multiple times. Once D is added into the predetermined message recipients during the process of B replying or forwarding the email, then when C directly replies to A's email afterwards, C will receive a prompt "D belongs to predetermined message recipients," so as to prevent C from missing D as the recipient or cc. In this way, such a confusion may be avoided that B adds D into the recipient list when replying to A's email, and C adds E into the recipient list when replying to A's email, and afterwards E cannot receive the email when D replies.

It should be noted that the term "unifying" in step 203 (as well as all "unifying" mentioned in the present invention) may all be implemented as only providing a prompt or an indication about inconsistency, while the final decision of whether to actually perform the updating operation lies in the hand of the user who needs to send a message or other application. Therefore, unifying the designated message recipients and the predetermined message recipients in step 203 may comprise updating the designated message recipients based on the predetermined message recipients, or comprise updating the designated message recipients based on the designated message recipients, wherein "updating the designated message recipients" may be actually updating the designated message recipients or providing a prompt, indication or suggestion about updating the designated message recipients. Likewise, "updating the predetermined message recipients" may comprise actually updating the predetermined message recipients or providing a prompt, indication or suggestion about updating the predetermined message recipients.

Figure 3:
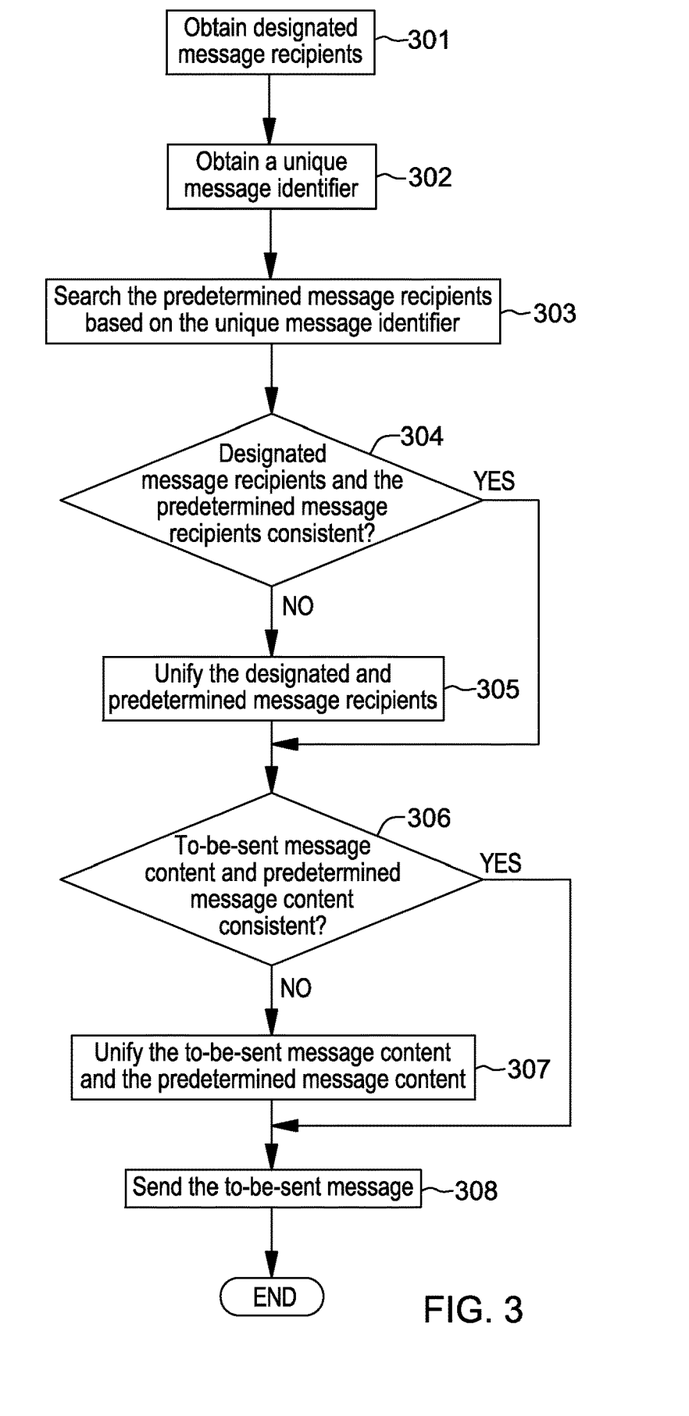
FIG. 3 shows a schematic diagram of a method for messaging according to another embodiment of the present invention.

FIG. 3 shows a schematic diagram of a method for messaging according to a further embodiment of the present invention. The method shown in FIG. 3 starts from step 301 of obtaining designated message recipients for a to-be-sent message. It should be understood that step 301 corresponds to step 201 in the method shown in FIG. 2, which will not be detailed here.

Next, the method shown in FIG. 3 proceeds to step 302 of obtaining a unique message identifier of the to-be-sent message. Where a correspondence relationship is established between the predetermined message recipients and the to-be-sent message through a unique message identifier, the unique message identifier is obtained in step 302; and in step 303, predetermined message recipient information having the unique message identifier is searched through the obtained unique message identifier. The meaning of the unique message identifier and how to establish a correspondence relationship between the predetermined message recipients and the to-be-sent message through the unique message identifier have been described in detail with reference to FIG. 2. For example, the unique message identifier of the to-be-sent message is PPP, and the system has already stored two pieces of information of predetermined message recipients with unique message identifiers being PPP and SSS, then it may be found who are the predetermined message recipients with the same unique message identifier PPP in step 303 through the obtained unique message identifier PPP of the to-be-sent message.

It should be noted that as described in FIG. 2, the to-be-sent message is not necessarily required to establish a correspondence relationship with predetermined message recipients through a unique message identifier. If other manner is employed to establish a correspondence relationship between the to-be-sent message and the predetermined message recipients, step 302 and step 303 are not compulsory.

Next, the method of FIG. 3 proceeds to step 304 of comparing the message recipients designated by the to-be-sent message and the predetermined message recipients corresponding to the to-be-sent message, i.e., deciding whether the designated message recipients and the predetermined message recipients are consistent (identical). In response to the message recipients designated by the to-be-sent message being inconsistent with the predetermined message recipients corresponding to the to-be-sent message, the method of FIG. 3 proceeds to step 305 of unifying the designated message recipients and the predetermined message recipients. About the specific manner of unifying the designated message recipients and the predetermined message recipients, it has been described above with reference to FIG. 2, which will not be detailed here.

In response to the message recipients designated by the to-be-sent message being consistent with the predetermined message recipients corresponding to the to-be-sent message, the method of FIG. 3 proceeds to step 306 of obtaining predetermined message content corresponding to the to-be-sent message, and comparing the to-be-sent message content and the predetermined message content, i.e., deciding whether the to-be-sent message content is consistent (identical) with the predetermined message content. Similar to obtaining the predetermined message recipients corresponding to the to-be-sent message, the predetermined message content corresponding to the to-be-sent message, as obtained in step 306, may also establish a correspondence relationship with the to-be-sent-message through the message unique identifier or through other manners introduced in the above description with reference to FIG. 2.

According to one embodiment of the present invention, the predetermined message content includes message content having the same unique message identifier and stored in time sequence. For example, A sends an email (email a) to B and C; afterwards, B replies to the email to A and C (email b), then the contents of emails a and b are stored sequentially as predetermined message contents in time sequence in the system. Since email b may include the content of original email a, when storing the predetermined message content, the repetitive email content may be removed while only storing the email content newly added in email b based on email a. According to another embodiment of the present invention, the predetermined message content includes links stored in time sequence and directed to the message content having the same unique message identifier. In some cases, directly storing the predetermined message content may occupy a large storage space (especially when the attachment of the email is relatively big); therefore, it is allowed to only store links directed to the message content having the same unique message identifier. These links may be pointers directed to specific message content or identifiers such as network addresses in any form, etc.

One of the objects of comparing to-be-sent message content and predetermined message content in step 306 is to confirm whether the to-be-sent message content misses some message content in the predetermined message content. For example, A sends email a to B and C; then B replies to the email to A and C (email b); afterwards, C replies to email a to A, B and D (email c); then when D attempts to reply to email c to A, B and C (email d), the email d will miss the content in email b. However, since emails a, b and c have the same unique message identifier, the contents of the three emails are all stored in predetermined message content in time sequence. By comparing the to-be-sent message content (the content of email d) and the predetermined message content in step 306, it would be found whether some message content is missed.

Those skilled in the art should understand that comparing the to-be-sent message content and the predetermined message content in step 306 may be implemented by content comparison techniques in the prior art for various kinds of formatted documents such as text, character string, picture, video, audio, compressed file, etc., which will not be detailed here.

Next, in response to the to-be-sent message content being inconsistent with the predetermined message content, the method of FIG. 3 proceeds to step 307 of unifying the to-be-sent message content and the predetermined message content. According to one embodiment of the present invention, unifying the to-be-sent message content and the predetermined message content includes: updating the to-be-sent message content based on the predetermined message content. Like the example above, when it is found that email d misses the content of email b, the content of email d is updated to include email b, thereby unifying the to-be-sent message content and the predetermined message content. This update may comprise the system automatically adding the content of email b into the to-be-sent email d, or generating an alarm to D such that D specifically decides whether to add the content of email b or not.

According to another embodiment of the present invention, unifying the to-be-sent message content and the predetermined message content comprises: updating the predetermined message content based on the message content to be sent, wherein the updated predetermined message content is used for providing predetermined message content for subsequent messaging. Since the to-be-sent message content usually adds new content based on the original message, these newly added message content are added into the original predetermined message content such that the updated predetermined message content is used for providing predetermined message content for subsequent messaging. In another circumstance, even if the to-be-sent message content misses some existing message content in the predetermined message content (as in the above example), user D may be prompted on whether the content of email b is regarded as unimportant or unnecessary, thereby deleting the content of email b in the predetermined message content.

Those skilled in the art should understand that, it may be flexibly adjusted based on the specific message application scenarios or user needs as to whether to update the predetermined message content based on the to-be-sent message content or update the to-be-sent message content based on the predetermined message content.

It should be further noted that, as mentioned in the literal description about step 203, the "unifying" in step 307 all may be implemented as only providing a prompt or an indication about inconsistency, but the final decision of whether to actually perform the updating operation lies in the hand of the user who needs to send a message or other application. Unifying the to-be-sent message content and the predetermined message content in step 307 may comprise updating the predetermined message content based on the to-be-sent message content, or may comprise updating the to-be-sent message content based on the predetermined message content, wherein "updating the to-be-sent message content" may comprise actually updating the to-be-sent message content or providing a prompt, indication or suggestion about updating the to-be-sent message content. Likewise, "updating the predetermined message content" may comprise actually updating the predetermined message content or providing a prompt, indication or suggestion about updating the predetermined message content.

In response to the to-be-sent message content being consistent with the predetermined message content, the method of FIG. 3 proceeds to step 308 of sending the to-be-sent message. Likewise, after completing the operation of step 307, the method of FIG. 3 also proceeds to step 308 of sending the to-be-sent message.

It should be noted that steps 306 and 307, which relate to unifying the message content, are not essential technical means in the present invention. Those skilled in the art may merely unify the message recipients without unifying the message content, which can likewise realize the objectives of the present invention. Besides, even if the method comprises steps 306 and 307 about unifying the message content, the execution sequence between steps 306-307 and steps 303-305 may also be flexibly adjusted; that is, steps 306 and 307 may be first performed before steps 303-305; or steps 303-305 may be first performed before steps 306-307. Or, the steps about unifying the message content and the steps about unifying message recipients may also be performed in parallel.

Figure 4:
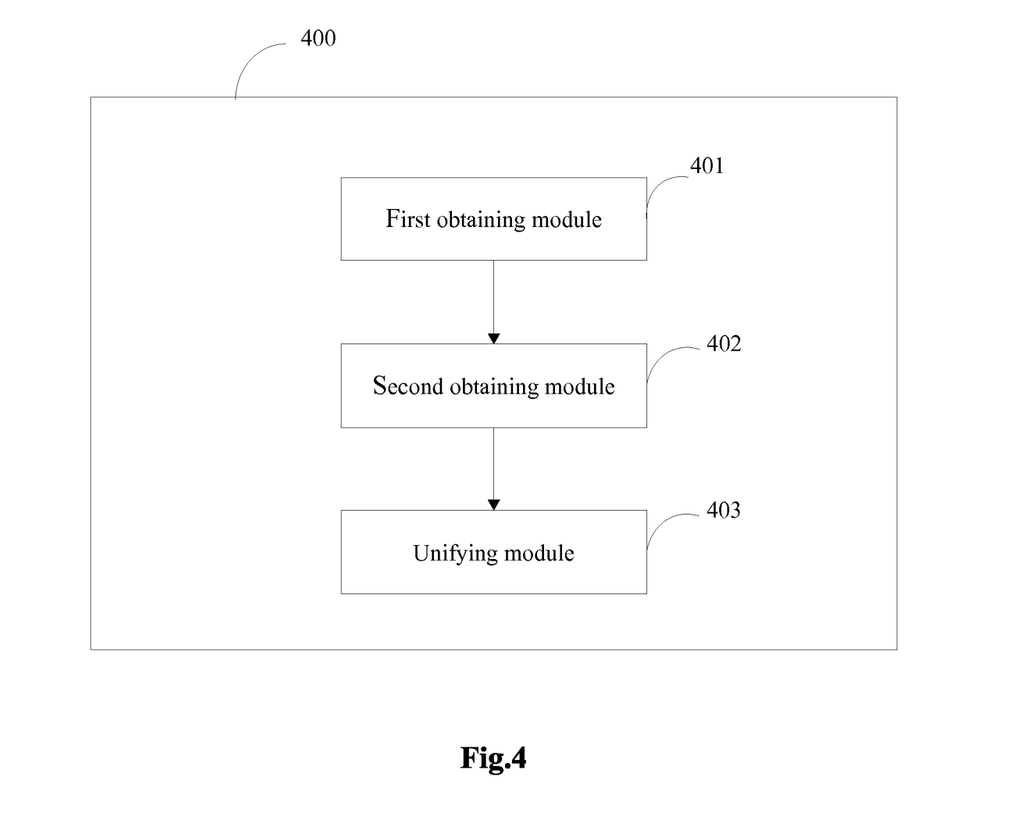
FIG. 4 shows a block diagram of a system for messaging according to one embodiment of the present invention.

FIG. 4 shows a block diagram of a system for messaging according to one embodiment of the present invention. The system shown in FIG. 4 is generally represented by system 400. Specifically, the system 400 comprises a first obtaining module 401 configured to obtain message recipients designed by a to-be-sent message, a second obtaining module 402 configured to obtain predetermined message recipients corresponding to the to-be-sent message; and a unifying module 403 configured to in response to the designated message recipients being inconsistent with the predetermined message recipients, unify the designated message recipients and the predetermined message recipients. Those skilled in the art should understand that modules 401-403 in the system 400 of FIG. 4 correspond to steps 201-203 in the method shown in FIG. 2, which will not be detailed here.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for messaging, comprising:
   obtaining, by one or more computer processors, one or more message recipients designated by a to-be-sent message;
   obtaining, by one or more computer processors, one or more predetermined message recipients corresponding to the to-be-sent message based on a unique message identifier, wherein the unique message identifier will automatically carry over if the subject of the email is modified, the unique message identifier is invisible to one or more users, the correspondence relationship between the one or more predetermined message recipients and the to-be-sent message may be established without adding any additional identifier, one of the one or more predetermined message recipients is automatically filtered, and the one or more predetermined message recipients can be updated at anytime;
   filtering, by the one or more computer processors, automatically added symbols for identifying specific operations to establish a correspondence relationship between the one or more predetermined message recipient and the to-be-sent message through actual information of an email subject, wherein automatically added symbols for identifying specific operations comprises: identifiers in a subject of an email;
   in response to the one or more designated message recipients being inconsistent with the one or more predetermined message recipients, unifying, by one or more computer processors, the one or more designated message recipients and the one or more predetermined message recipients, wherein a user is notified of a change to the predetermined message recipients;
   obtaining, by one or more computer processors, predetermined message content corresponding to the to-be-sent message, wherein the predetermined message content includes: a message content having an identical unique message identifier and stored in time sequence, and one or more links stored in time sequence and directed to a message content having an identical unique message identifier, wherein the links are pointers directed to specific message content and network addresses; and
   in response to the to-be-sent message content being inconsistent with the predetermined message content, unifying, by one or more computer processors, the to-be-sent message content and the predetermined message content based on the unique identifier comprising:
     updating, by one or more computer processors, the to-be-sent message content based on the predetermined message content; and
     updating, by one or more computer processors, the predetermined message content based on the to-be-sent message content, wherein the updated predetermined message content is for providing predetermined message content for subsequent messaging.

2. The method according to claim 1, wherein unifying the one or more designated message recipients and the one or more predetermined message recipients comprises:
   updating, by one or more computer processors, the one or more designated message recipients based on the one or more predetermined message recipients.

3. The method according to claim 1, wherein unifying the one or more designated message recipients and the one or more predetermined message recipients comprises:
   updating, by one or more computer processors, the one or more predetermined message recipients based on the one or more designated message recipients, wherein the updated one or more predetermined message recipients are for providing information of one or more predetermined message recipients for subsequent messaging.

4. The method according to claim 1, wherein a correspondence relationship is established between one or more predetermined message recipients and the to-be-sent message via a unique message identifier, and wherein obtaining the one or more predetermined message recipients corresponding to the to-be-sent message comprises:
   obtaining, by one or more computer processors, the unique message identifier of the to-be-sent message; and
   searching, by one or more computer processors, information of one or more predetermined message recipients having the unique message identifier through the obtained unique message identifier.

5. The method according to claim 1, wherein the to-be-sent message comprises at least one of the following:
   email, instant message, SMS short message.

6. The method according to claim 1, further comprising:
in response to the one or more designated message recipients being consistent with the one or more predetermined message recipients, sending, by one or more computer processors, the to-be-sent message.

7. A computer system comprising:
one or more computer processors;
one or more computer readable storage devices;
program instructions stored on the one or more computer readable storage devices for execution by at least one of the one or more computer processors, the stored program instructions comprising:
  program instructions to obtain one or more message recipients designated by a to-be-sent message;
  program instructions to obtain one or more predetermined message recipients corresponding to the to-be-sent message based on a unique message identifier, wherein the unique message identifier will automatically carry over if the subject of the email is modified, the unique message identifier is invisible to one or more users, the correspondence relationship between the one or more predetermined message recipients and the to-be-sent message may be established without adding any additional identifier, one of the one or more predetermined message recipients is automatically filtered, and the one or more predetermined message recipients can be updated at anytime;
  program instructions to filter automatically added symbols for identifying specific operations to establish a correspondence relationship between the one or more predetermined message recipient and the to-be-sent message through actual information of an email subject, wherein automatically added symbols for identifying specific operations comprises: identifiers in a subject of an email;
  in response to the one or more designated message recipients being inconsistent with the one or more predetermined message recipients, program instructions to unify the one or more designated message recipients and the one or more predetermined message recipients, wherein a user is notified of a change to the predetermined message recipients;
  program instructions to obtain predetermined message content corresponding to the to-be-sent message, wherein the predetermined message content includes: a message content having an identical unique message identifier and stored in time sequence, and one or more links stored in time sequence and directed to a message content having an identical unique message identifier, wherein the links are pointers directed to specific message content and network addresses; and
  in response to the to-be-sent message content being inconsistent with the predetermined message content, program instructions to unify the to-be-sent message content and the predetermined message content based on the unique identifier comprising:
    program instructions to update the to-be-sent message content based on the predetermined message content; and
    program instructions to update the predetermined message content based on the to-be-sent message content, wherein the updated predetermined message content is for providing predetermined message content for subsequent messaging.

8. The computer system according to claim 7, wherein the program instructions to unify the one or more designated message recipients further comprises:
  program instructions to update the one or more designated message recipients based on the predetermined message recipients.

9. The computer system according to claim 7, wherein the program instructions to unify the one or more designated message recipients further comprises:
  program instructions to update the one or more predetermined message recipients based on the one or more designated message recipients, wherein the updated one or more predetermined message recipients are for providing information of one or more predetermined message recipients for subsequent messaging.

10. The computer system according to claim 7, further comprising:
  in response to the designated message recipients being consistent with the predetermined message recipients, program instructions to send the to-be-sent message.

11. A computer program product for messaging, the computer program product comprising:
  one or more computer readable storage devices and program instructions stored on the one or more computer readable storage devices, the stored program instructions comprising:
    program instructions to obtain one or more message recipients designated by a to-be-sent message;
    program instructions to obtain one or more predetermined message recipients corresponding to the to-be-sent message based on a unique message identifier, wherein the unique message identifier will automatically carry over if the subject of the email is modified, the unique message identifier is invisible to one or more users, the correspondence relationship between the one or more predetermined message recipients and the to-be-sent message may be established without adding any additional identifier, one of the one or more predetermined message recipients is automatically filtered, and the one or more predetermined message recipients can be updated at anytime;
    program instructions to filter automatically added symbols for identifying specific operations to establish a correspondence relationship between the one or more predetermined message recipient and the to-be-sent message through actual information of an email subject, wherein automatically added symbols for identifying specific operations comprises: identifiers in a subject of an email;
    in response to the one or more designated message recipients being inconsistent with the one or more predetermined message recipients, program instructions to unify the one or more designated message recipients and the one or more predetermined message recipients, wherein a user is notified of a change to the predetermined message recipients;
    program instructions to obtain predetermined message content corresponding to the to-be-sent message, wherein the predetermined message content includes: a message content having an identical unique message identifier and stored in time sequence, and one or more links stored in time sequence and directed to a message content having an identical unique message identifier, wherein the links are pointers directed to specific message content and network addresses; and in response to the to-be-sent message content being inconsistent with the predetermined message content, program instructions to unify the to-be-sent message content and the predetermined message content based on the unique identifier comprising:

program instructions to update the to-be-sent message content based on the predetermined message content; and program instructions to update the predetermined message content based on the to-be-sent message content, wherein the updated predetermined message content is for providing predetermined message content for subsequent messaging.

12. The computer program product according to claim 11, wherein the program instructions to unify the one or more designated message recipients and the one or more predetermined message recipients comprise:

program instructions to update the one or more designated message recipients based on the one or more predetermined message recipients.

* * * * *